United States Patent
Baker, Jr. et al.

(10) Patent No.: US 10,241,683 B2
(45) Date of Patent: Mar. 26, 2019

(54) NON-VOLATILE RAM SYSTEM

(71) Applicant: FREESCALE SEMICONDUCTOR, INC., Austin, TX (US)

(72) Inventors: Frank Kelly Baker, Jr., Austin, TX (US); David B. Kramer, Cedar Park, TX (US); Anirban Roy, Austin, TX (US)

(73) Assignee: NXP USA, Inc., Austin, TX (US)

( * ) Notice: Subject to any disclaimer, the term of this patent is extended or adjusted under 35 U.S.C. 154(b) by 219 days.

(21) Appl. No.: 14/922,565

(22) Filed: Oct. 26, 2015

(65) Prior Publication Data

US 2017/0115879 A1    Apr. 27, 2017

(51) Int. Cl.
G06F 3/06       (2006.01)
G06F 12/0804    (2016.01)
G06F 12/0868    (2016.01)

(52) U.S. Cl.
CPC ............. *G06F 3/061* (2013.01); *G06F 3/065* (2013.01); *G06F 3/0619* (2013.01); *G06F 3/0644* (2013.01); *G06F 3/0685* (2013.01); *G06F 12/0868* (2013.01); *G06F 12/0804* (2013.01); *G06F 2212/1032* (2013.01); *G06F 2212/205* (2013.01)

(58) Field of Classification Search
CPC ...... G06F 3/061; G06F 3/0619; G06F 3/0644; G06F 2212/205
See application file for complete search history.

(56) References Cited

U.S. PATENT DOCUMENTS

| | | | |
|---|---|---|---|
| 5,438,549 A * | 8/1995 | Levy | G11C 5/141 365/185.08 |
| 5,438,679 A | 8/1995 | Inomata et al. | |
| 6,816,401 B2 | 11/2004 | Kauffmann et al. | |
| 7,038,959 B2 | 5/2006 | Garni | |
| 7,245,527 B2 | 7/2007 | Qureshi et al. | |
| 7,560,952 B2 | 7/2009 | Zhu et al. | |
| 7,855,916 B2 | 12/2010 | Rao | |
| 8,074,034 B2 * | 12/2011 | Sartore | G06F 12/0638 711/119 |
| 8,363,457 B2 | 1/2013 | Keshtbod | |
| 8,437,188 B2 | 5/2013 | Kajigaya | |
| 8,531,880 B2 | 9/2013 | Rao | |
| 8,645,738 B2 | 2/2014 | Voutilainen | |
| 2003/0229653 A1 * | 12/2003 | Nakanishi | G06F 11/1451 |

(Continued)

FOREIGN PATENT DOCUMENTS

WO      9829816      7/1998

OTHER PUBLICATIONS

Lim et al, "An optimal DRAM sizing and partitioning method for NVRAM based hybrid memory architecture", IECE Electronics Express, Sep. 29, 2014, pp. 1-6, vol. 11, No. 19.

(Continued)

*Primary Examiner* — Michael Krofcheck

(57) ABSTRACT

A data processing system includes a backup nonvolatile memory (NVM), a random access memory (RAM), and a controller. The RAM includes a plurality of partitions, each partition having a different corresponding backup frequency. The controller is configured to back up the contents of each partition of the RAM to the backup NVM in accordance with the corresponding backup frequency.

14 Claims, 1 Drawing Sheet

| | | BACK-UP | | |
|---|---|---|---|---|
| PARTITION | MEMORY FUNCTION | FREQUENCY | ALLOCATED TIME | AMOUNT OF DATA |
| 1 | CONTINUOUS BACK-UP | HIGH | VERY SHORT | SMALL |
| 2 | UNSCHEDULED POWER DOWN | LOW | SHORT | MEDIUM |
| 3 | SCHEDULED POWER DOWN | MEDIUM | LONG | LARGE |
| 4 | ONE TIME PROGRAMMABLE (OTP) | ONCE | VERY SHORT | VARIABLE |
| 5 | STANDARD RAM | N/A | N/A | N/A |

(56) References Cited

U.S. PATENT DOCUMENTS

| | | | | |
|---|---|---|---|---|
| 2009/0031098 | A1* | 1/2009 | Sartore | G06F 11/1441 711/162 |
| 2011/0258364 | A1* | 10/2011 | Leung | G06F 12/0246 711/103 |
| 2012/0137055 | A1* | 5/2012 | Lee | G06F 12/0223 711/103 |
| 2012/0206243 | A1* | 8/2012 | Butler | G06K 7/0008 340/10.51 |
| 2013/0262738 | A1* | 10/2013 | Kwon | G06F 12/0238 711/102 |
| 2013/0275661 | A1 | 10/2013 | Zimmer et al. | |
| 2013/0286721 | A1 | 10/2013 | Jung et al. | |
| 2014/0189204 | A1* | 7/2014 | Sugimoto | G06F 3/061 711/103 |
| 2014/0325116 | A1* | 10/2014 | McKelvie | G06F 12/0246 711/103 |
| 2014/0337589 | A1* | 11/2014 | Carpenter | G06F 3/0604 711/157 |
| 2016/0147620 | A1* | 5/2016 | Lesartre | G06F 11/1666 714/6.3 |

OTHER PUBLICATIONS

Wang et al, "Designing Scratchpad Memory Architecture with Emerging STT-RAM Memory Technologies", IEEE International Symposium on Circuits and Systems (ISCAS), May 19-23, 2013, pp. 1244-1247.

Ohsawa et al, "A 1 Mb Nonvolatile Embedded Memory Using 4T2MTJ Cell With 32 b Fine-Grained Power Gating Scheme", IEEE Journal of Solid-State Circuits, Jun. 2013, pp. 1511-1520, vol. 48, No. 6.

Klostermann et al, "A Perpendicular Spin Torque Switching based MRAM for the 28 nm Technology Node", IEEE International Electron Devices Meeting, Dec. 10-12, 2007, pp. 187-190.

Xu et al, Design of Spin-Torque Transfer Magnetoresistive RAM and CAM/TCAM with High Sensing and Search Speed, IEEE Transactions on Very Large Scale Integration (VLSI) Systems, Jan. 2010, pp. 66-74.

\* cited by examiner

| PARTITION | MEMORY FUNCTION | BACK-UP | | |
|---|---|---|---|---|
| | | FREQUENCY | ALLOCATED TIME | AMOUNT OF DATA |
| 1 | CONTINUOUS BACK-UP | HIGH | VERY SHORT | SMALL |
| 2 | UNSCHEDULED POWER DOWN | LOW | SHORT | MEDIUM |
| 3 | SCHEDULED POWER DOWN | MEDIUM | LONG | LARGE |
| 4 | ONE TIME PROGRAMMABLE (OTP) | ONCE | VERY SHORT | VARIABLE |
| 5 | STANDARD RAM | N/A | N/A | N/A |

… # NON-VOLATILE RAM SYSTEM

BACKGROUND

Field

This disclosure relates generally to integrated circuits, and more particularly, to memories that have characteristics of random access memories (RAMs) and non-volatile memories (NVMs).

Related Art

The promise of a single memory type that has all of the desirable characteristics of a non-volatile memory (NVM) and a random access memory (RAM), such as a dynamic random access memory (DRAM) or a static random access memory (SRAM), has not been fulfilled but there has been some success in combining NVMs and RAMs to achieve some characteristics of a RAM while still being non-volatile. The desire is to achieve the speed, both read and write, of an SRAM while still being truly non-volatile and having very high endurance while being the same size as a flash memory. Technologies such as MRAM and other resistance RAMs have come closer to the speed objective but still, especially in writing, are slower than SRAMs and DRAMs although much faster than floating gate memories which are by far the most common type of NVM in current production. Thus, the newer NVM technologies have some advantages over floating gate such as endurance but are still not as fast as RAMs. Thus, the typical solution remains using SRAM or DRAM where needed for speed and floating gate as needed for non-volatility.

Accordingly, there is a need to provide further improvement in obtaining a memory that has the speed of RAM while also being non-volatile.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figures 1, 2:
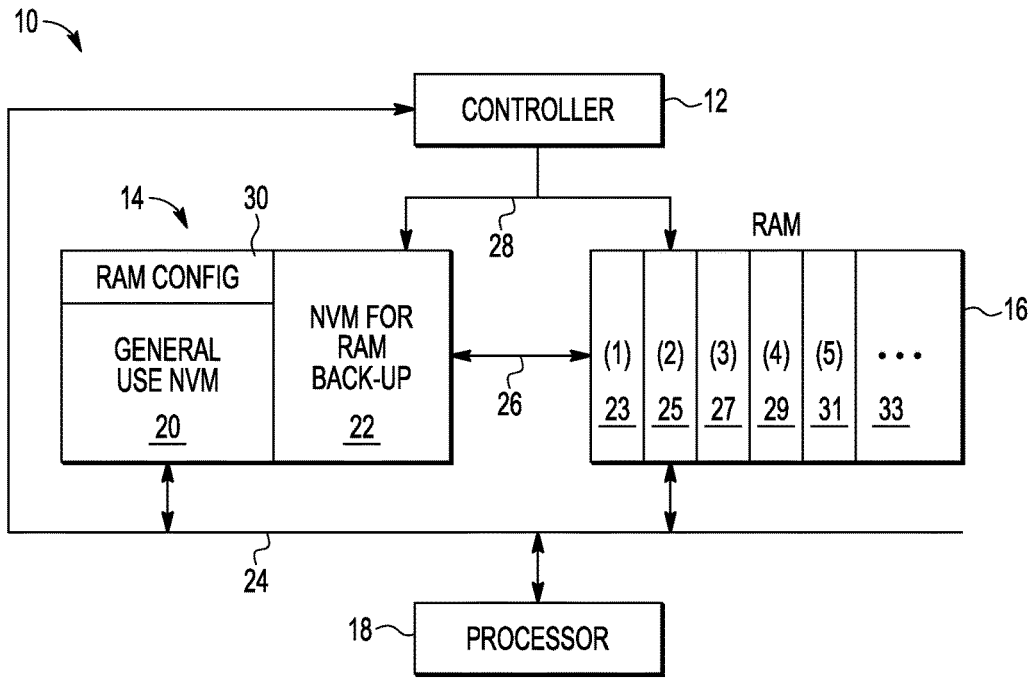
FIG. 1 is a block diagram of a system having a memory system with the characteristics of RAM and NVM.
FIG. 2 is a table showing functions available for the memory of FIG. 1.

In one aspect, a system has a non-volatile memory (NVM) and a RAM in which the RAM is partitioned so that each partition has the data for particular backup operations with the result of normal operation being at the speeds of a RAM and resulting in non-volatile storage. This is better understood by reference to the drawings and the following written description.

Shown in FIG. 1 is a system 10 having a controller 12, an NVM 14, a RAM 16, and a processor 18. NVM 14 is divided into a general use NVM 20 and an NVM 22 for RAM backup. Controller 12, general use NVM 20, RAM 16, and processor 12 are coupled to a bus 23. NVM 22 and RAM 16 are coupled to bus 26. RAM 16 has a first partition 23, a second partition 25, a third partition 27, a fourth partition 29, a fifth partition 31, and a normal operation partition 33. General use NVM 20 has a RAM configuration register RAM CONFIG 30.

At the initial start-up of system 10, processor 18 loads RAM CONFIG 30 with configuration information that provides information as to how RAM 16 will be partitioned for use by processor 18. Controller 12 reads RAM CONFIG 30 to determine how to partition RAM 16 for use by processor 18. One of the characteristics stored in RAM CONFIG 30 is a backup frequency indicator for each partition.

Shown in FIG. 2 is a table showing how partitions 1-5, which are partitions 23, 25, 27, 29, and 31, will be used based on the memory function and its corresponding backup in NVM 22. Backup occurs by placing data in NVM 22 that is present in RAM 16. In this example, system 10 has the capability of five partitions which can vary in size but may have a maximum size. In this example, only four of the partitions are to have a specialized use and the fifth partition will not have a specialized use. Processor 18 reads the operating conditions of RAM 16 from RAM CONFIG 30 and so writes into the partitions of RAM 16 according to the contents of RAM CONFIG 30. RAM CONFIG 30 provides information as to how much memory and which address range each partition will have which may be at least a minimum amount and not exceed a maximum amount. The minimum may or may not be zero.

In the case of first partition 23, the memory function is continuous backup. So data that needs continuous backup is loaded into partition 23 by processor 18. Because the backup is continuous, the frequency of backup is high, but each backup event will be very short. Because the backups occur frequently, the amount of data needing backup is small. For partition 23, the data backup into NVM 22 is very current because the backup is continuous. Each backup occurs at the write speed of NVM 22. It takes longer for NVM 22 to complete the write but that does not delay the operation of RAM 16. As soon as RAM 16 finishes its portion of the writing of data into NVM 22, it can begin another operation. Thus RAM 16 operates without delay and NVM 22 provides for non-volatile storage. Controller 12 controls the transfer of data from RAM 16 to NVM 22 so that processor 18 is not slowed by this backup function. This is true of the other backup functions as well.

For the second partition, partition 25, its function is for an unscheduled power-down, such as a loss of power. The frequency of this type of event is low. Also the allotted time to achieve the backup of the data in the event of the unscheduled power-down is small by necessity because power can be maintained for only a short time. The amount of data that can be loaded may be desirably large but the limitations of the write-time to NVM 22 may limit the amount of data to a medium amount. Thus, this ability to respond to the unscheduled power-down event aids in this even having minimal impact on operational efficiency because the event is relatively rare and the data is quickly written from RAM 16. With controller 12 performing the transfer from RAM 16 to NVM 22, processor 18 is free to perform other functions in the small amount of time available before power-down actually occurs.

For the third partition, partition 27, its function is for a scheduled power-down which may be for a power saving mode in which some circuits are disabled but the intent is to maintain the overall system as much as possible so that when power is restored, the system is in the state it was in when the power-down occurred. In such case much more memory is likely to be required to restore the system to its pre-power-down state than for the unscheduled power-down case. In this scheduled power-down case, however, the time to store the information is significantly less critical. Partition 27 thus is the source of the information to be stored in NVM 22 that is then available for bringing the system back to its pre-power-down state. Because controller 12 performs the transfer from partition 27 to NVM 22, processor 18 continues to perform tasks as needed with little, if any, slowdown.

For partitions 23, 25, and 27, a possible use is as the RAM portion of a cache. This would result in the cache being backed up. The backup feature is not always conveniently achieved in a cache.

For the fourth partition, partition 29, its function is to perform a one time program (OTP) which only occurs once. The OTP is for storing, in NVM, information that will always be applicable to the operation of system 10. The actual time this storage is performed may be almost anytime, but will typically be performed as part of the initial start-up of system 10. Thus the information is provided by the user, and processor 18 loads it into partition 29 of RAM 16. Then, when directed to do so by processor 18, controller 12 loads the contents of partition 29 into NVM 22. Those contents in NVM 22 will then be read only.

For the fifth partition, partition 31, its function is as a conventional RAM. In effect, partition 31 can be used in the same way as normal operation partition 33. RAM CONFIG does not provide a specialized use for partition 31 although controller 12 would have the capacity to transfer data from partition 31 to NVM 22. In this case, the user, in loading RAM CONFIG 30, chose not to have a dedicated backup operation for partition 31. Thus, in operation, partition 31 can be read and written by processor 18 as if it were part of normal operation partition 33. Partition 31 could be used as the RAM portion of a cache and would not be backed up.

After a scheduled or unscheduled power-down event, controller 12 can restore the contents of partitions 23, 25, 27 and 29 by copying the appropriate data from NVM 22 into these partitions of RAM 16. In this way, the contents of these partitions are effectively non-volatile which still providing full speed read and write capability between processor 18 and RAM 16.

The backing up is performed substantially independent of the processor by a separate controller 12 which is configured to access the RAM configuration storage circuitry 30 to perform backups from the RAM 16 to backup NVM 22 in accordance with the backup frequency indicator for each partition. Also it is allowed for each partition of the plurality of partitions of the RAM to have a different allotted amount of time for backups and a different amount of data allowed for backups. One benefit of this is that the processor can continue functioning in its normal way while the backup is occurring. Because the backup involves NVM which is relatively slow to write even if it is greatly improved over floating gate NVM, the processor's capabilities may be limited by that while the backup is occurring. Separating the performance of the backup from the processor, results in more efficient overall operation. The dedication of partitions to different backup functions is significant in allowing a controller, which now does not have to be nearly so complex as the processor, to perform the backup.

By now it should be appreciated that there has been disclosed a data processing system including a backup NVM, a RAM, and a controller. The RAM has a plurality of partitions, each partition having a different corresponding backup frequency. The controller is configured to back up contents of each partition of the plurality of partitions to the backup NVM in accordance with the corresponding backup frequency. The data processing system may further include a processor, wherein the controller moves data from the plurality of partitions to the NVM independent of the processor. The data processing system may have a further characterization by which the processor is configured to continue performing operations while the controller is performing backups from the RAM to the NVM. The data processing system may have a further characterization by which the controller is configured to perform continuous backups for a first partition of the plurality of partitions. The data processing system may have a further characterization by which the controller is configured to perform backups in response to scheduled power downs for a second partition of the plurality of partitions. The data processing system may have a further characterization by which the controller is configured to perform backups in response to unscheduled power downs for a third partition of the plurality of partitions. The data processing system may have a further characterization by which the RAM further includes a standard RAM partition in which the controller is configured to access the standard RAM partition as a conventional RAM. The data processing system may have a further characterization by which the RAM further includes a one time programmable partition and the controller is configured to store data from the one time programmable partition to the NVM as read only data. The data processing system may further include an NVM memory, wherein the NVM memory includes the backup NVM and a general use NVM. The data processing system may further include RAM configuration storage circuitry which stores a backup frequency indicator for each partition of the plurality of the partitions. The data processing system may have a further characterization by which the controller is configured to access the RAM configuration storage circuitry to perform backups from the RAM to the backup NVM in accordance with the backup frequency indicator for each partition. The data processing system may have a further characterization by which each RAM partition of the plurality of RAM partitions has a different allotted amount of time for backups and a different amount of data allowed for backups. The data processing system may have a further characterization by which the controller is configured to, after a power down event, restore data from the backup NVM to the plurality of partitions of the RAM. The data processing system may have a further characterization by which at least one partition of the plurality of partitions is configured to operate as a cache for the general use NVM Also disclosed is a data processing system having a backup NVM, a RAM, a controller, and RAM configuration storage circuitry. The RAM has a plurality of partitions, each partition having a different corresponding memory function. The controller is configured to store contents from each partition of the plurality of partitions to the backup NVM in accordance with the corresponding memory function. The RAM configuration storage circuitry is configured to store a memory function indicator corresponding to each partition of the plurality of partitions. The data processing system may further include a processor, wherein the controller moves data from partitions of the plurality of partitions to the backup NVM independent of the processor. The data processing system may have a further characterization by which the memory function corresponding to a first partition of the plurality of partitions is backing up data from the RAM to the NVM in response to a power down event. The data processing system may have a further characterization by which the memory function corresponding to a second partition of the plurality of partitions is storing data from the RAM to the NVM as read only data.

Disclosed also is a method in a data processing system having a backup non-volatile memory (NVM), a random access memory (RAM), a controller, and a processor. The method includes accessing, by the controller, RAM configuration circuitry to determine a backup frequency corresponding to each of a plurality of partitions of the RAM. The method further includes performing, by the controller, a backup operation in each partition of the plurality of partitions by copying data from the plurality of partitions of the RAM to the backup NVM in accordance with the backup frequency indicated by the RAM configuration circuitry. The method further includes performing, by the processor, normal operations while the controller is performing the backup operations. The method may have a further characterization by which the controller performs a first backup operation in a first partition of the plurality of partitions in response to a scheduled power down event, a second backup operation in a second partition of the plurality of partitions in response to an unscheduled power down event, and continuous backups in a third partition of the plurality of partitions. The method may have a further characterization by which each partition of the plurality of partitions of the RAM has a different allotted amount of time for backups and a different amount of data allowed for backups.

Although the invention is described herein with reference to specific embodiments, various modifications and changes can be made without departing from the scope of the present invention as set forth in the claims below. For example, the particular type of non-volatile element can vary from the disclosed type. Further, the number of partitions can vary and other functions of a partition than those disclosed may be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system comprising:
   a backup nonvolatile memory (NVM);
   a random access memory (RAM) having a plurality of partitions, each partition having a different corresponding backup frequency that is greater than zero; and
   a controller, wherein the controller is configured to back up the contents of each partition of the RAM to the backup NVM in accordance with the corresponding backup frequency.

2. The data processing system of claim 1, further comprising:
   a processor, wherein the controller moves data from partitions of the RAM to the NVM independent of the processor.

3. The data processing system of claim 2, wherein the processor is configured to continue performing operations while the controller is performing backups from the RAM to the NVM.

4. The data processing system of claim 1, wherein the controller is configured to perform continuous backups for a first partition of the plurality of partitions as writes to the first partition occur.

5. The data processing system of claim 4, wherein the controller is configured to perform backups in response to scheduled power downs for a second partition of the plurality of partitions.

6. The data processing system of claim 5, wherein the controller is configured to perform backups in response to unscheduled power downs for a third partition of the plurality of partitions.

7. The data processing system of claim 1, wherein the RAM further includes a standard RAM partition in which the controller is configured to access the standard RAM partition as a conventional RAM.

8. The data processing system of claim 1, wherein the RAM further includes a one time programmable partition, wherein the controller is configured to store data from the one time programmable partition to the NVM as read only data.

9. The data processing system of claim 1, further comprising an NVM memory, wherein the NVM memory includes the backup NVM and a general use NVM.

10. The data processing system of claim 9, wherein at least one partition of the plurality of partitions is configured to operate as a cache for the general use NVM.

11. The data processing system of claim 1, further comprising RAM configuration storage circuitry which stores a backup frequency indicator for each partition of the plurality of the partitions.

12. The data processing system of claim 11, wherein the controller is configured to access the RAM configuration storage circuitry to perform backups from the RAM to the backup NVM in accordance with the backup frequency indicator for each partition.

13. The data processing system of claim 11, wherein each RAM partition of the plurality of RAM partition has a different allotted amount of time for backups and a different amount of data allowed for backups.

14. The data processing system of claim 1, wherein the controller is configured to, after a power down event, restore data from the backup NVM to the plurality of partitions of the RAM.

* * * * *